United States Patent
Kwon et al.

(10) Patent No.: US 11,960,855 B2
(45) Date of Patent: Apr. 16, 2024

(54) METHOD AND APPARATUS FOR PERFORMING DEEP LEARNING OPERATIONS

(71) Applicant: Samsung Electronics Co., Ltd., Suwon-si (KR)

(72) Inventors: Hyung-Dal Kwon, Hwaseong-si (KR); Hanmin Park, Seoul (KR); Seungwook Lee, Suwon-si (KR); Jae-Eon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 17/102,884

(22) Filed: Nov. 24, 2020

(65) Prior Publication Data

US 2022/0035629 A1 Feb. 3, 2022

(30) Foreign Application Priority Data

Jul. 31, 2020 (KR) .................. 10-2020-0096008

(51) Int. Cl.
*G06F 7/544* (2006.01)
*G06F 7/57* (2006.01)
*G06N 3/08* (2023.01)

(52) U.S. Cl.
CPC .............. *G06F 7/5443* (2013.01); *G06F 7/57* (2013.01); *G06N 3/08* (2013.01)

(58) Field of Classification Search
CPC . G06F 7/5443; G06F 7/50; G06F 7/57; G06F 15/8046; G06F 17/16; G06N 3/08; G06N 3/04; G06N 3/063
See application file for complete search history.

(56) References Cited

U.S. PATENT DOCUMENTS

| | | | |
|---|---|---|---|
| 8,218,635 | B2 | 7/2012 | Topham |
| 9,207,908 | B1* | 12/2015 | Langhammer ........ G06F 7/5443 |
| 10,049,082 | B2 | 8/2018 | Ling et al. |
| 10,489,116 | B1* | 11/2019 | Esposito ................ G06F 7/57 |
| 10,915,297 | B1* | 2/2021 | Halutz ................ G06F 17/153 |
| 2005/0021578 | A1* | 1/2005 | Chen .................. G06F 15/7867 |
| | | | 708/230 |
| 2017/0300337 | A1* | 10/2017 | Langhammer ........ G06F 9/3001 |

(Continued)

FOREIGN PATENT DOCUMENTS

KR 10-2009-0105365 A 10/2009
KR 10-2019-0065144 A 6/2019

(Continued)

OTHER PUBLICATIONS

Bai, Lin et al., "A CNN Accelerator on FPGA Using Depthwise Separable Convolution", *IEEE Transactions on Circuits and Systems II: Express Briefs*, vol. 65, Issue 10, Oct. 2018 (pp. 1415-1419).

*Primary Examiner* — Jyoti Mehta
*Assistant Examiner* — Huy Duong
(74) *Attorney, Agent, or Firm* — NSIP Law

(57) ABSTRACT

Disclosed is an apparatus and method for performing deep learning operations. The apparatus includes a systolic array comprising multiplier accumulator (MAC) units, and a control circuit configured to control an operation of a multiplexer connected to at least one of the MAC units and operations of the MAC units according to a plurality of operation modes.

21 Claims, 16 Drawing Sheets

(56) References Cited

U.S. PATENT DOCUMENTS

| | | |
|---|---|---|
| 2018/0314671 A1 | 11/2018 | Zhang et al. |
| 2018/0336164 A1 | 11/2018 | Phelps et al. |
| 2019/0114499 A1 | 4/2019 | Delaye et al. |
| 2019/0187983 A1* | 6/2019 | Ovsiannikov ......... G06F 7/5443 |
| 2019/0197019 A1 | 6/2019 | Patil et al. |
| 2019/0228051 A1 | 7/2019 | Langhammer et al. |
| 2019/0244084 A1* | 8/2019 | Cho ........................ G06N 3/04 |
| 2020/0076435 A1* | 3/2020 | Wang ............... H03K 19/17724 |
| 2021/0256360 A1* | 8/2021 | Nam .......................... G06F 7/50 |
| 2021/0303358 A1* | 9/2021 | Zaidy ...................... G06F 17/16 |
| 2022/0036165 A1 | 2/2022 | Kwon |

FOREIGN PATENT DOCUMENTS

| | | |
|---|---|---|
| KR | 10-2019-0099931 A | 8/2019 |
| KR | 10-2020-0011362 A | 2/2020 |

\* cited by examiner

METHOD AND APPARATUS FOR PERFORMING DEEP LEARNING OPERATIONS

CROSS-REFERENCE TO RELATED APPLICATIONS

This application claims the benefit under 35 USC § 119(a) of Korean Patent Application No. 10-2020-0096008 filed on Jul. 31, 2020 in the Korean Intellectual Property Office, the entire disclosure of which is incorporated herein by reference for all purposes.

BACKGROUND

Field

The following description relates to a method and apparatus for performing deep learning operations.

2. Description of Related Art

Currently, an adder tree structure is used for low-power driving in an embedded neural processing unit (NPU).

The adder tree structure may achieve the same performance while using about half the power compared to a systolic array. However, for an operation such as depthwise convolution, the utilization of multiplier accumulator (MAC) units drops, resulting in a sharp decrease in throughput.

However, an architecture that considers only the utilization of MAC units does not support elementwise add/multiply operations and thus, requires power consumption for a relatively large area except for a depthwise operation. Accordingly, there is a need for an operation device for performing elementwise add/multiply operations while reducing power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provide an apparatus for performing deep learning operations, the apparatus including a systolic array comprising multiplier accumulator (MAC) units, and a control circuit configured to control an operation of a multiplexer connected to at least one of the MAC units and operations of the MAC units according to a plurality of operation modes.

The multiplexer may include a first multiplexer connected to input terminals of adders of the MAC units.

The multiplexer may include a second multiplexer connected to output terminals of accumulators of the MAC units.

The multiplexer further may include a third multiplexer connected to output terminals of the MAC units, and a shift register connected to the third multiplexer.

The MAC units, the first multiplexer, and the second multiplexer may be configured to operate based on a first clock frequency.

The third multiplexer and the shift register may be configured to operate based on a second clock frequency, and the second clock frequency may be an integer multiple of a first clock frequency applied to the MAC units.

A ratio of the first clock frequency and the second clock frequency may be determined based on the number of MAC units connected to the third multiplexer.

The multiplexer may be connected to input terminals of the MAC units.

In another general aspect, there is provide a method of performing deep learning operations, the method comprising receiving an operation mode and input data, controlling operations of multiplier accumulator (MAC) units included in a systolic array in response to the operation mode, and controlling a multiplexer connected to at least one of the MAC units.

The controlling of the multiplexer may include controlling inputs of adders of the MAC units in response to the operation mode.

The controlling of the multiplexer may include controlling outputs of accumulators of the MAC units in response to the operation mode.

The controlling of the multiplexer may include controlling outputs of the MAC units, and shifting the outputs of the MAC units.

Controlling the MAC units, controlling inputs of adders of the MAC units, and controlling outputs of accumulators of the MAC units may be performed based on a first clock frequency.

The controlling of the outputs of the MAC units and the shifting of the outputs of the MAC units may be performed based on a second clock frequency, and the second clock frequency may be an integer multiple of a first clock frequency for controlling the MAC units, controlling inputs of adders of the MAC units, and controlling outputs of accumulators of the MAC units.

A ratio of the first clock frequency and the second clock frequency may be determined based on the number of MAC units connected to a multiplexer configured to control the outputs of the MAC units.

The controlling of the multiplexer may include controlling inputs of the MAC units in response to the operation mode.

In another general aspect, there is provide an apparatus for performing deep learning operations, the apparatus comprising a systolic array comprising multiplier accumulator (MAC) units, and a multiplexer set connected to at least one of the MAC units, and a control circuit configured to control an operation of the multiplexer and MAC units according to a plurality of operation modes, wherein the multiplexer set may include a first multiplexer connected to input terminals of adders of the MAC units, a second multiplexer connected to output terminals of accumulators of the MAC units, and a third multiplexer connected to output terminals of the MAC units.

The MAC units, the first multiplexer, and the second multiplexer may operate on a first clock frequency, and the third multiplexer may operate on a second clock frequency that may be an integer multiple of the first clock frequency.

A ratio of the first clock frequency and the second clock frequency may be determined based on a number of MAC units connected to the third multiplexer.

A shift register may be connected to the third multiplexer and the third multiplexer may be further connected to an output terminal of the second multiplexer.

Other features and aspects will be apparent from the following detailed description, the drawings, and the claims.

Figure 1A:
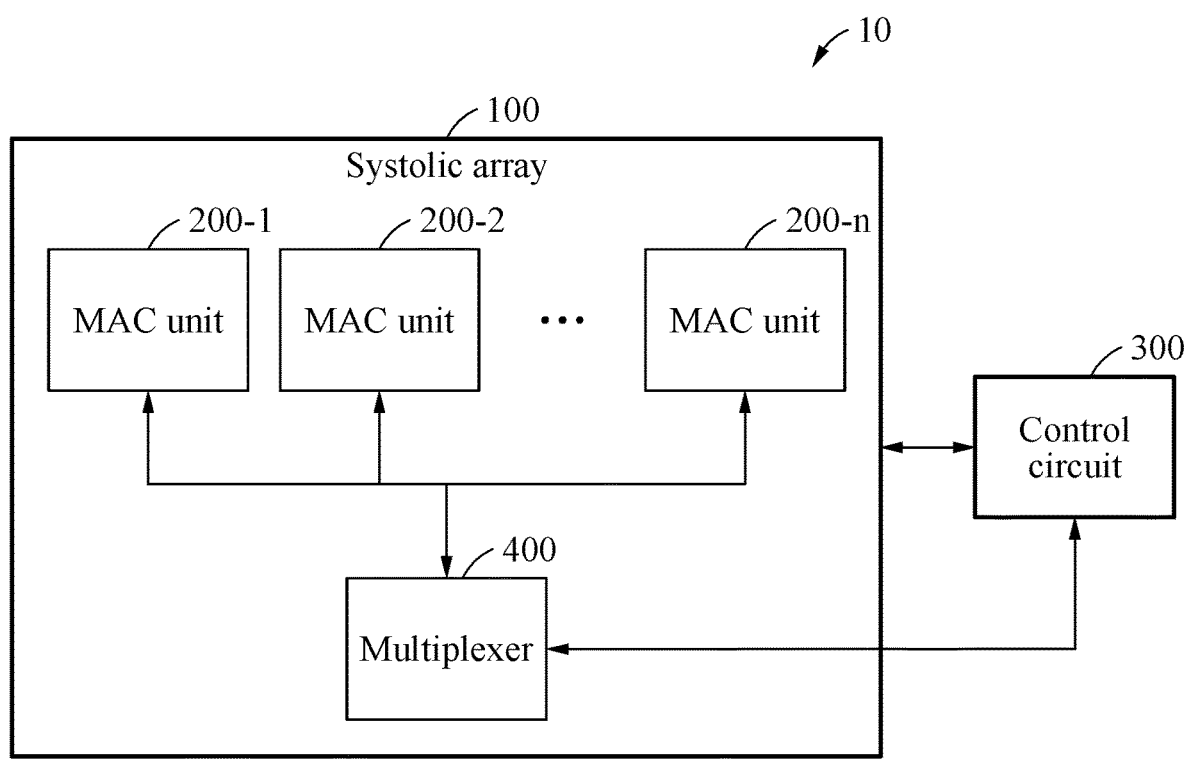
FIG. 1A illustrates an example of an apparatus for performing deep learning operations.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms such as first, second, A, B, (a), (b) may be used herein to describe various members, components, regions, layers, or sections, these members, components, regions, layers, or sections are not to be limited by these terms. These terms are used only to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. The sequences, or the orders of the constituent elements are not limited by these terms.

When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions on the examples may be applicable to the following examples and thus, duplicated descriptions will be omitted for conciseness.

Figure 1B:
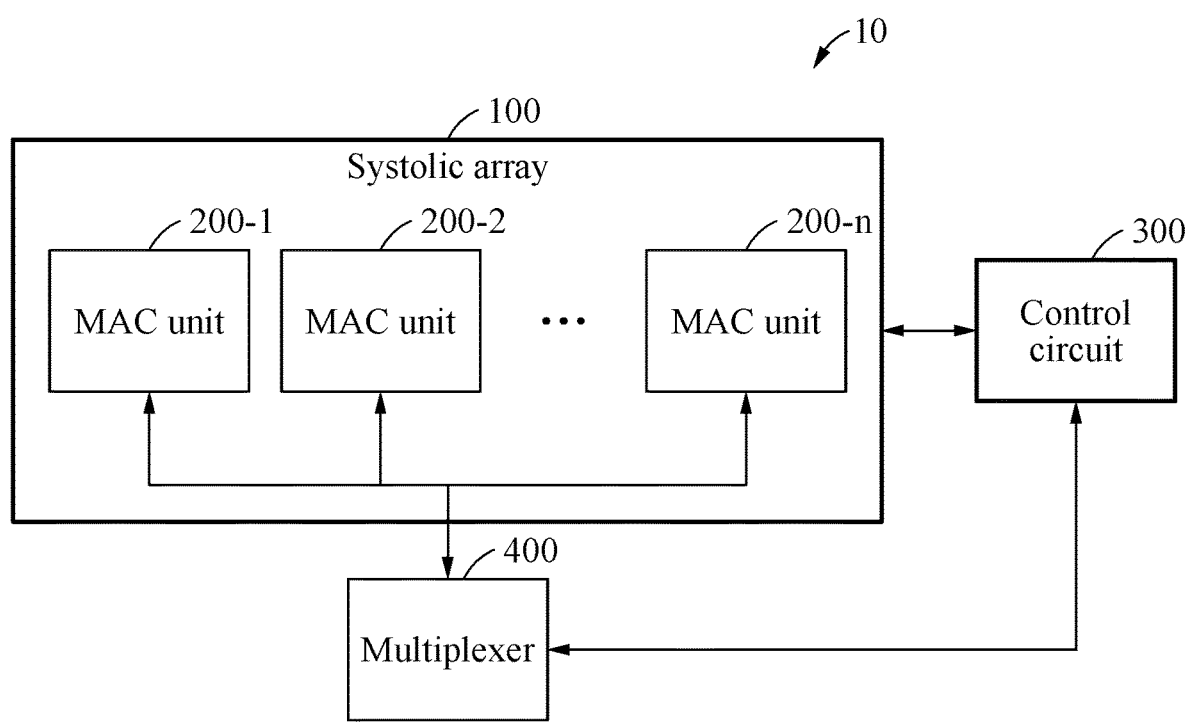
FIG. 1B illustrates an example of an apparatus for performing deep learning operations.

FIG. 1A illustrates an example of an apparatus for performing deep learning operations, and FIG. 1B illustrates an example of an apparatus for performing deep learning operations.

An apparatus 10 for performing deep learning operations may perform operations performed in an artificial neural network or a neural network. The apparatus 10 may perform various operations required for training the neural network and performing inference using the neural network.

The neural network (or an artificial neural network) includes a statistical training algorithm that has an ability to solve a problem, where artificial neurons (nodes) forming the network through synaptic combinations change a connection strength of synapses through training.

The neural network includes a deep neural network (DNN). The neural network includes neural networks such as, for example, a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

For example, the apparatus 10 may input data into the neural network, train the neural network with output data through operations such as convolution, and extract features using the trained artificial neural network.

The apparatus 10 may perform various operations used in the neural network. The apparatus 10 may perform various operations by controlling an operation mode.

The neural network may include a convolution neural network (CNN). The CNN may be used to extract the features from the input data. For example, the CNN may extract visual features such as edges, lines, colors, and the like from an input image.

The CNN may include a plurality of layers. Each layer may receive data, and generate output data by processing data input into the corresponding layer.

The data output from the layer may be a feature map generated by performing a convolution operation on an image or feature map input to the CNN with a weight of one or more filters. Initial layers of the CNN may extract simple features such as edges or gradients from the input, and subsequent layers of the CNN may extract progressively more complex features such as eyes, nose, and the like from the image.

The CNN may include convolutional operations. The convolution operation may include a process of generating an output feature map through multiply and add operations between an input feature map having a width and height and including one or more channels and a filter having a width and height.

The convolution operation may include a depthwise convolution operation. The depthwise convolution operation may perform a convolution operation only within the same channel, and extract a spatial feature of each channel through this.

The apparatus 10 includes a systolic array 100 and a control circuit 300. The systolic array 100 may include a plurality of multiplier accumulator (MAC) units 200-1, 200-2, . . . , 200-n and a multiplexer 400.

The apparatus 10 may further include a shift register connected to the multiplexer 400. The shift register will be described in detail with reference to FIGS. 2A to 4D.

The control circuit 300 may support a plurality of operation modes by controlling the plurality of MAC units 200-1, 200-2, . . . , 200-n. The plurality of operation modes may include an adder tree mode, a single instruction multiple data (SIMD) mode, and a systolic mode. In addition, each mode may include input stationary, weight stationary, and output stationary operations.

The control circuit 300 may receive an operation mode and input data. The control circuit 300 may control operations of the plurality of MAC units 200-1, 200-2, . . . , 200-n included in the systolic array 100 in response to the operation mode.

The control circuit 300 may control an operation of the multiplexer 400 connected to at least one of the plurality of MAC units 200-1, 200-2, . . . , 200-n and operations of the MAC units 200-1, 200-2, . . . , 200-n. For example, the control circuit 300 may control inputs of adders of the plurality of MAC units 200-1, 200-2, . . . , 200-n by controlling the multiplexer 400 in response to the operation mode.

The control circuit 300 may control inputs of the plurality of MAC units 200-1, 200-2, . . . , 200-n in response to the operation mode. The control circuit 300 may control outputs of accumulators of the plurality of MAC units by controlling the multiplexer 400 in response to the operation mode.

The control circuit 300 may include a processor (not shown). The processor may process data stored in a memory. The processor may execute a computer-readable code (for example, software) stored in the memory and instructions triggered by the processor.

The "processor" may be a data processing device implemented by hardware including a circuit having a physical structure to perform desired operations. For example, the desired operations may include instructions or codes included in a program.

For example, the hardware-implemented data processing device may include a microprocessor, a central processing unit (CPU), a processor core, a multi-core processor, a multiprocessor, an application-specific integrated circuit (ASIC), and a field programmable gate array (FPGA). Further details regarding the processor is provided below.

The multiplexer 400 may select one of analog or digital input signals and transmit the selected input signal to one line. The multiplexer 400 may be connected to at least one of the plurality of MAC units 200-1, 200-2, . . . , 200-n. The multiplexer 400 may be a multiplexer set including a plurality of multiplexers.

For example, the multiplexer 400 may include a first multiplexer, a second multiplexer, and a third multiplexer. The first multiplexer may be connected to input terminals of the adders of the plurality of MAC units 200-1, 200-2, . . . , 200-n. The second multiplexer may be connected to output terminals of the accumulators of the plurality of MAC units. The third multiplexer may be connected to an output terminal of the second multiplexer and/or output terminals of the plurality of MAC units 200-1, 200-2, . . . , 200-n.

The first multiplexer, the second multiplexer, or the third multiplexer may include a plurality of multiplexers.

The multiplexer 400 may be located inside the systolic array 100 as shown in FIG. 1A, or may be located outside the systolic array 100 as shown in FIG. 1B. In another example, the multiplexer 400 may be implemented in a manner that some of the multiplexers included in the multiplexer 400 may be inside the systolic array 100, and the other multiplexers may be outside the systolic array 100.

The control circuit 300 may control outputs of a plurality of second multiplexers that control the outputs of the accumulators.

The plurality of MAC units, the first multiplexer, and the second multiplexer may operate based on a first clock frequency. In other words, the plurality of MAC units, the first multiplexer, and the second multiplexer may operate at the same clock frequency.

The third multiplexer and the shift register may operate based on a second clock frequency. In this case, the second clock frequency may be an integer multiple of the first clock frequency. In other words, a ratio of the first clock frequency and the second clock frequency may be an integer.

The ratio of the first clock frequency and the second clock frequency may be determined based on the number of MAC units connected to the third multiplexer. For example, when four MAC units are connected to the third multiplexer, the second clock frequency may be 4 times the first clock frequency.

The control circuit 300 may apply a clock frequency that is an integer multiple of a clock frequency applied to the plurality of MAC units, to the third multiplexer of the multiplexer 400 and the shift register. In other words, the clock frequency applied to the third multiplexer may be an integer multiple of the clock frequency applied to the plurality of MAC units 200-1, 200-2, . . . , 200-n. The multiplexer 400 will be described further with reference to FIGS. 2A to 4D.

The shift register connected to the multiplexer 400 may be connected to the accumulators of the plurality of MAC units 200-1, 200-2, . . . , 200-n. The shift register may shift an input or output of a multiplexer. The shift register may shift the outputs of the accumulators included in the plurality of MAC units 200-1, 200-2, . . . , 200-n.

The apparatus 10 may further include a memory (not shown). The memory may store instructions (or programs) executable by the processor. For example, the instructions may include instructions to perform an operation of the processor and/or an operation of each element of the processor.

The memory may be implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory is provided below.

Figure 2A:
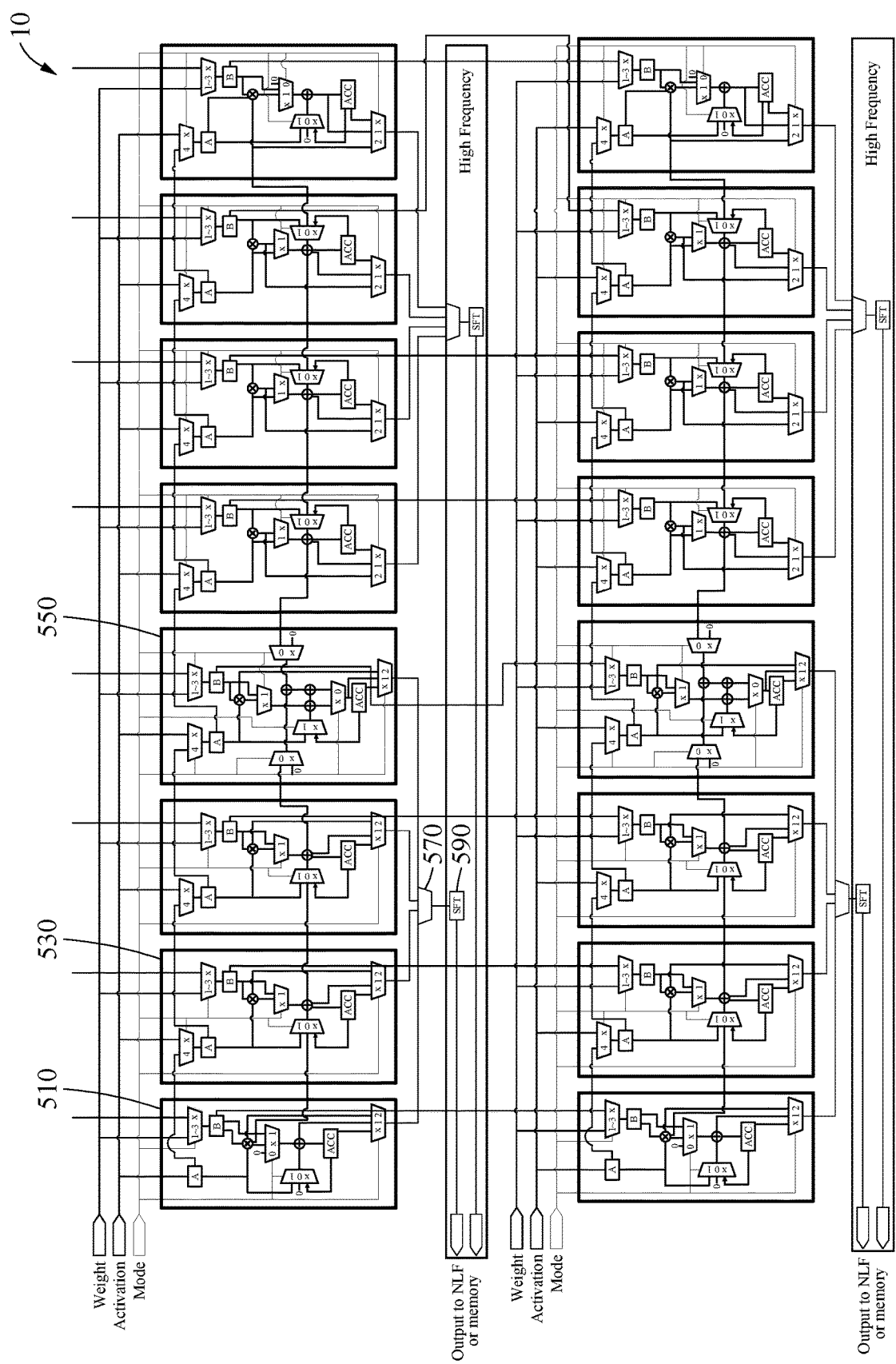
FIG. 2A illustrates an example of a circuit diagram of an apparatus for performing deep learning operations.
Figure 2B:
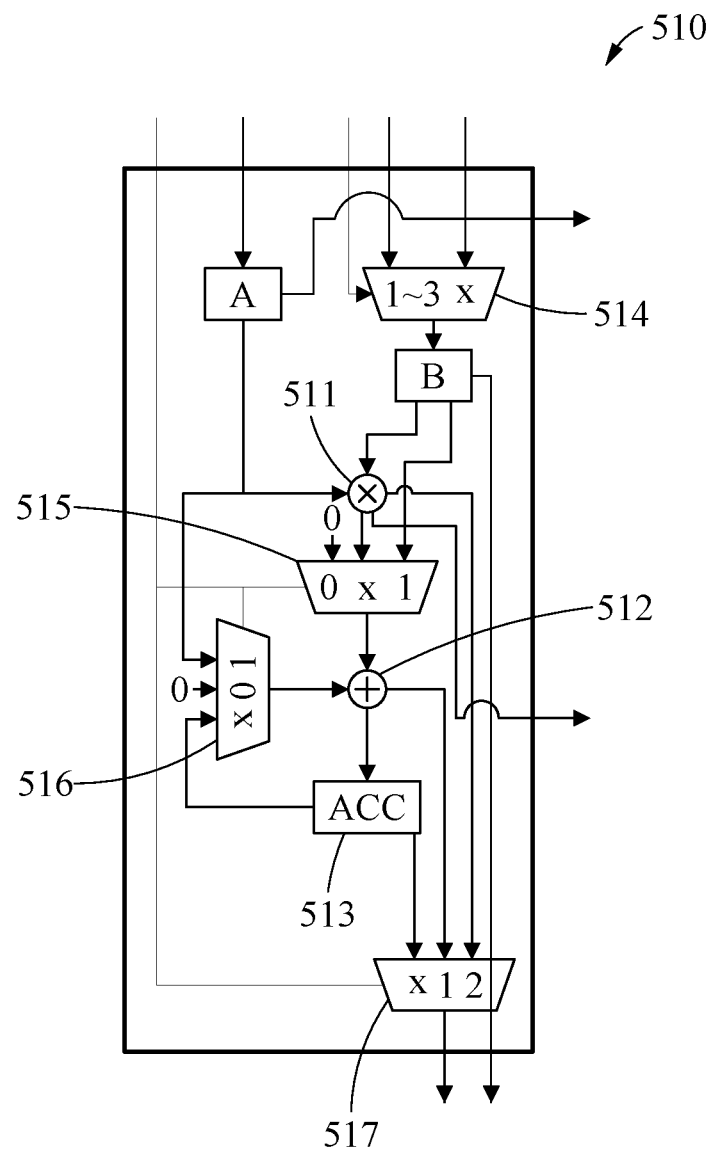
FIG. 2B illustrates an example of a processing element (PE) of the apparatus for performing deep learning operations shown in FIG. 2A.
Figure 2C:
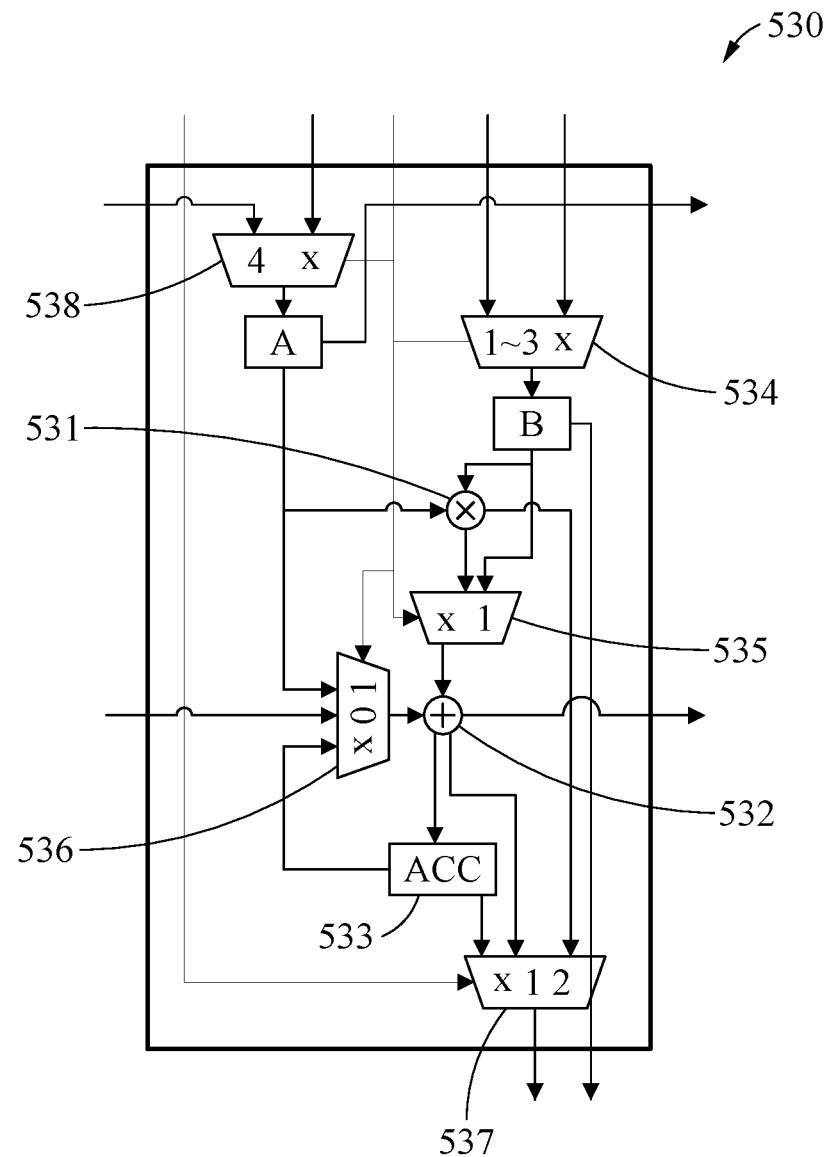
FIG. 2C illustrates an example of a PE of the apparatus for performing deep learning operations shown in FIG. 2A.
Figure 2D:
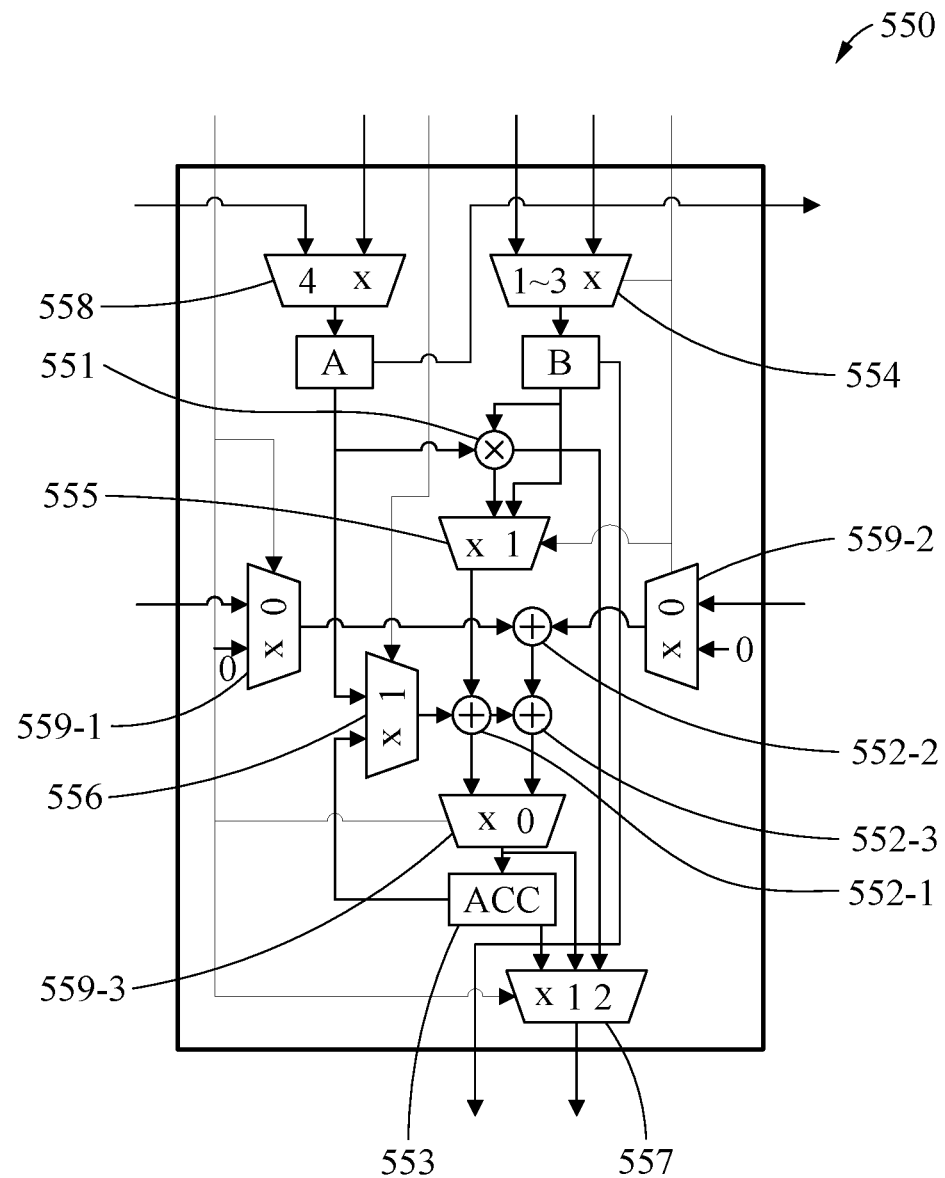
FIG. 2D illustrates an example of a PE of the apparatus for performing deep learning operations shown in FIG. 2A.

FIG. 2A illustrates an example of a circuit diagram of an apparatus for performing deep learning operations, and FIGS. 2B to 2D illustrate examples of processing elements (PEs) of the apparatus for performing deep learning operations shown in FIG. 2A.

Referring to 2A to 2D, an apparatus 10 for performing deep learning operations may include PEs 510, 530, and 550, a multiplexer 570, and a shift register 590.

The apparatus 10 may operate in an adder tree mode, a SIMD mode, and a systolic mode.

Specifically, the apparatus 10 may operate an input stationary, weight stationary, or output stationary manner in each mode.

The input stationary manner may be one that performs a matrix operation or a convolution operation by changing a weight value only while fixing an input value required for a multiply operation.

Unlike the input stationary manner, the weight stationary manner may be one that performs an operation by changing an input value while fixing a weight value.

The output stationary manner may be one that accumulates outputs through an accumulator while simultaneously changing both an input value and a weight value required for a multiply operation.

The apparatus 10 may perform elementwise add, elementwise multiply, and depthwise convolution operations in the SIMD mode.

The plurality of PEs 510, 530, and 550 may receive input data and perform an operation. For example, each of the PEs 510, 530, and 550 may be configured as a MAC unit to perform an operation of ACC=ACC+(A×B).

In the example of FIG. 2B, the PE 510 may include a multiplier 511, an adder 512, and an accumulator 513. The PE 510 may further include multiplexers 514, 515, 516, and 517.

The multiplier 511 may perform a multiply operation on input data. The multiplier 511 may perform multiplication by receiving input data A and B, as shown in FIGS. 2A and 2B, and output a result of the multiplication to the multiplexer 515, 516, or 517.

The adder 512 may perform addition on the input data. The adder 512 may perform addition on the outputs of the multiplexer 515 and the multiplexer 516 and output a result of the addition to the accumulator 513 and the multiplexer 517.

The accumulator 513 may accumulate the output of the adder 512 as described above. For example, the accumulator 513 may perform an operation of ACC=ACC+(A×B). The accumulator 513 may output a result of the accumulation to the multiplexer 517.

Since the PE 510 includes the accumulator 513, the apparatus 10 may perform a depthwise convolution operation that performs a convolution operation for each channel. For example, the PEs 510, 530, and 550 may perform depthwise convolution operations between input feature maps (3, 3) having predetermined height and width and including one or more channels and filters having predetermined height and width.

The control circuit 300 may control outputs of the multiplexers 514, 515, 516, and 517 by controlling mode signals. The mode signal "0" may be a signal that makes an adder tree connected in a two-dimensional (2D) form transfer activation values or weight vales to a subsequent adder tree by one row per clock.

The mode signal "1" may be a mode signal for performing elementwise addition, and a signal for adding a value of a port that applies an activation and a value of a port that applies a weight. In this case, the add operation may be performed by inputting another activation value into the port that applies a weight.

The mode signal "2" may be a mode signal for elementwise multiplication, and a signal for simultaneously processing a multiply operation by applying another activation to the weight port, like the mode signal "1".

The mode signal "3" may be a mode signal for using a path from the port directly to the adder tree so that different data may be input into each row and column of the adder tree for depthwise convolution.

The mode signal "4" may be a signal for a systolic array mode. In the systolic array mode, the activation value and the weight value of a 2D systolic array may be simultaneously applied, and the output may be accumulated by the accumulator 513 of the MAC unit.

In the multiplexers 514, 515, 516, and 517 shown in FIG. 2B, "x" may denote all modes other than the numbers indicated in the multiplexers 514, 515, 516, and 517.

For example, 1~3 is indicated on the left, and "x" is indicated on the right for the multiplexer 514. In this case, the input on the left may be output when the mode signals 1 to 3 are input, and the input on the right may be output when the other value is input as a mode signal.

In the example of FIG. 2A, excellent operation performance may be achieved in a layer (for example, an input layer) including fewer channels.

The multiplexer 514 may output one of a weight and a weight received from a systolic array of another row in response to a control signal from the control circuit 300.

The control circuit 300 may perform an elementwise add operation by controlling the multiplexer 515 and the multiplexer 516.

The multiplexer 515 may be connected to an input terminal of the adder 512 and operate as the first multiplexer described above. The multiplexer 515 may selectively output one of 0, the output of the multiplier 511, and the input data B in response to a control signal received from the control circuit 300.

The multiplexer 515 may operate to perform an elementwise add operation between the input data A and the input data B by outputting the input data B not passing through the multiplier 511 to the adder 512.

The multiplexer 516 may selectively output one of the input data A, 0, and the output of the accumulator 513 in response to a control signal received from the control circuit 300.

The multiplexer 517 may be connected to an output terminal of the accumulator 513 and operate as the second multiplexer described above. The multiplexer 517 may selectively output one of the output of the accumulator 513, the output of the adder 512, and the output of the multiplier 511 in response to a control signal from the control circuit 300.

The output of the multiplexer 517 may be input into the multiplexer 570 outside the PE 510.

In the example of FIG. 2C, the PE 530 may include a multiplier 531, an adder 532, and an accumulator 533. The PE 530 may further include multiplexers 534, 535, 536, 537, and 538.

The operations of the multiplier 531, the adder 532, and the accumulator 533 may be the same as those described in FIG. 2B. The operation of the multiplexer 534 may be the same as that of the multiplexer 514, and the operation of the multiplexer 535 may be the same as that of the multiplexer 515.

The operation of the multiplexer 536 may be the same as that of the multiplexer 516, and the operation of the multiplexer 537 may be the same as that of the multiplexer 517.

The multiplexer 538 may selectively output one of the input data A received from the PE 510 and an activation value received from the outside in response to a control signal from the control circuit 300.

FIG. 2D illustrates an example of a circuit diagram in which the PE 550 is located at the center of the systolic array 100. The PE 550 may include a multiplier 551, adders 552-1, 552-2, and 552-3, and an accumulator 553. The PE 550 may further include multiplexers 554, 555, 556, 557, 558, 559-1, 559-2, and 559-3.

The operations of the multiplier 551, the adders 552-1, 552-2, and 552-3, and the accumulator 553 may be the same as those described in FIG. 2B. The operation of the multiplexer 554 may be the same as that of the multiplexer 514, and the operation of the multiplexer 555 may be the same as that of the multiplexer 515.

The multiplier 551 may multiply the input data A and B and output a result of the multiplication to the multiplexer 555 and the multiplexer 557.

The adder 552-1 may add an output of the multiplexer 555 and an output of the multiplexer 556, and output a result of the addition to the adder 552-3 and the multiplexer 559-3. The adder 552-2 may add outputs of the multiplexer 559-1 and the multiplexer 559-2 and output a result of the addition to the adder 552-3. The adder 552-3 may add the output of the adder 552-1 and the output of the adder 552-2 and output a result of the addition to the multiplexer 559-3.

Unlike the multiplexer 516, the multiplexer 556 may selectively output one of the output of the accumulator 553 and the input data A to the adder 552-1 in response to a control signal from the control circuit 300.

The multiplexer 557 may selectively output one of the output of the accumulator 553, the multiplier 551, and the output of the multiplexer 559-3. Like the multiplexer 517, the multiplexer 557 may be connected to the multiplexer 570 located outside the PE 550. The input data B may also be output to the outside of the PE 550.

The operation of the multiplexer 558 may be the same as that of the multiplexer 538. The multiplexer 559-1 may output one of 0 and an output of an adder of the PE located on the left side of the PE 550 to the adder 552-2 in response to a control signal from the control circuit 300.

The multiplexer 559-2 may output one of 0 and an output of an adder of the PE located on the right side of the PE 550 to the adder 552-2. The adder 552-2 may perform addition of the outputs of the multiplexer 559-1 and the multiplexer 559-2.

The multiplexer 559-3 may output one of the outputs of the adder 552-1 and the adder 552-2 to the accumulator 553 or the multiplexer 557 in response to a control signal from the control circuit 300.

The multiplexer 570 may selectively output one of the outputs of the PEs to the shift register 590. The shift register 590 may transmit the outputs of the PEs 510 to 550 to the output terminal without delay as being assigned a clock frequency higher than a clock frequency applied to the PEs 510 to 550.

Figure 3A:
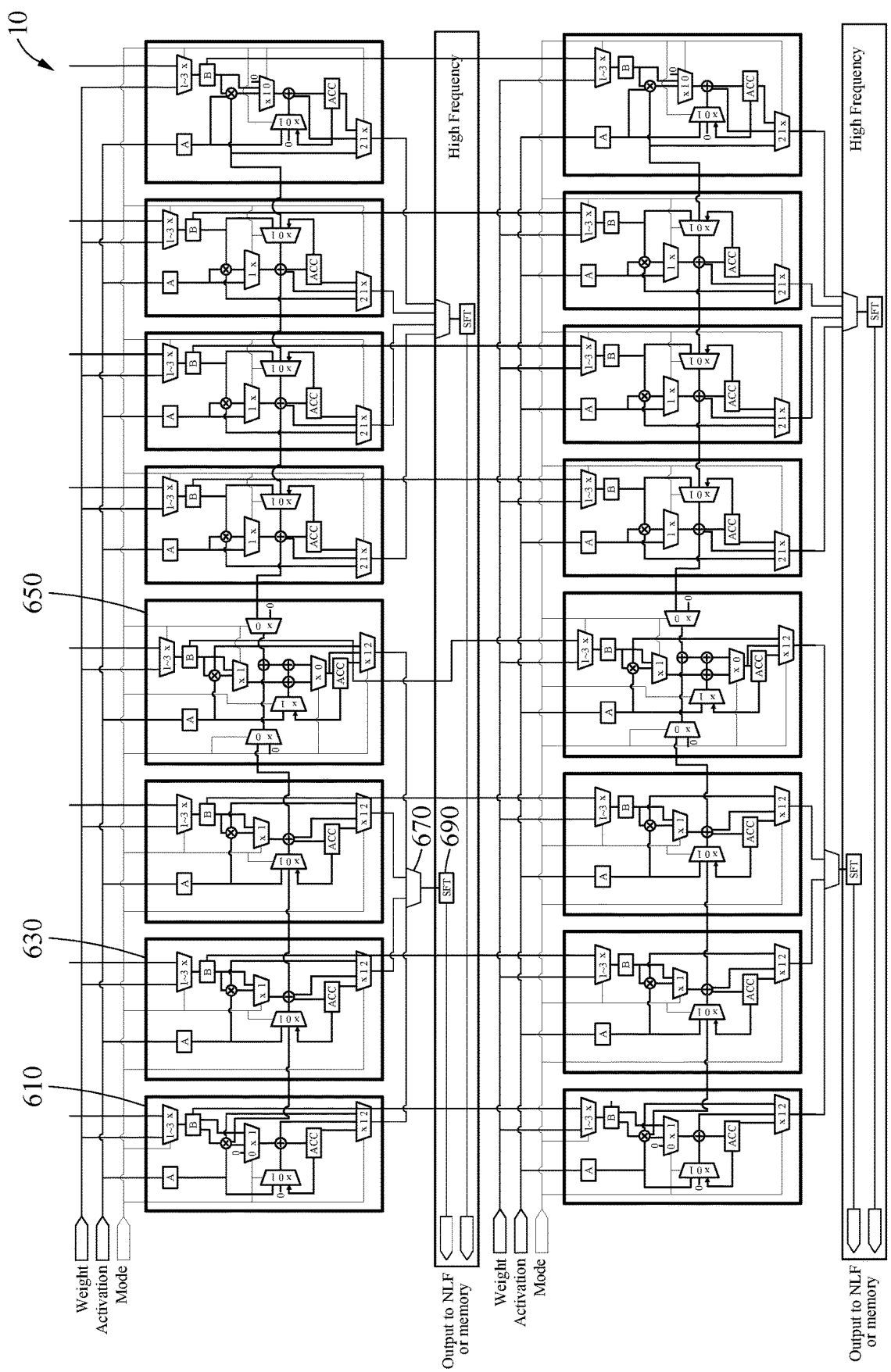
FIG. 3A illustrates an example of a circuit diagram of an apparatus for performing deep learning operations.
Figure 3B:
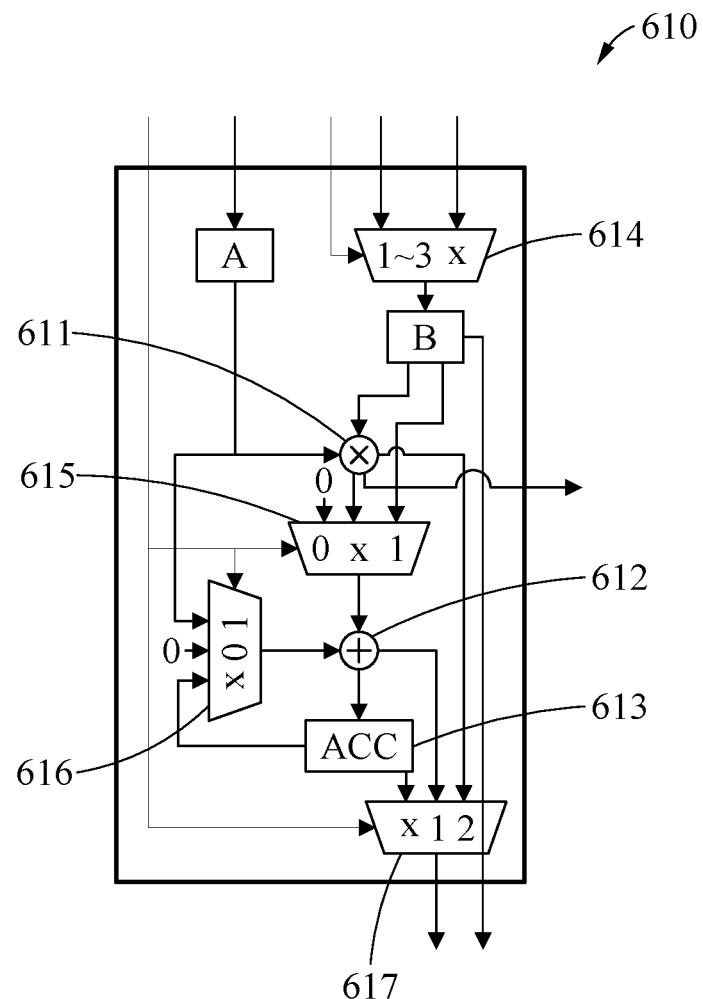
FIG. 3B illustrates an example of a PE of the apparatus for performing deep learning operations shown in FIG. 3A.
Figure 3C:
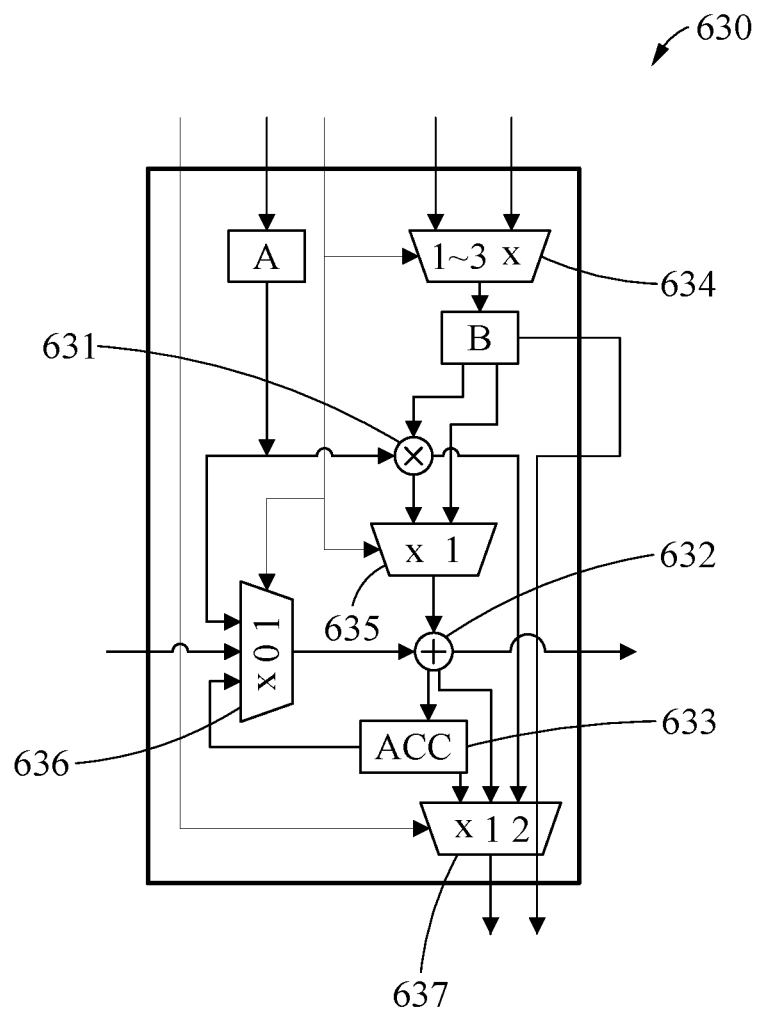
FIG. 3C illustrates an example of a PE of the apparatus for performing deep learning operations shown in FIG. 3A.
Figure 3D:
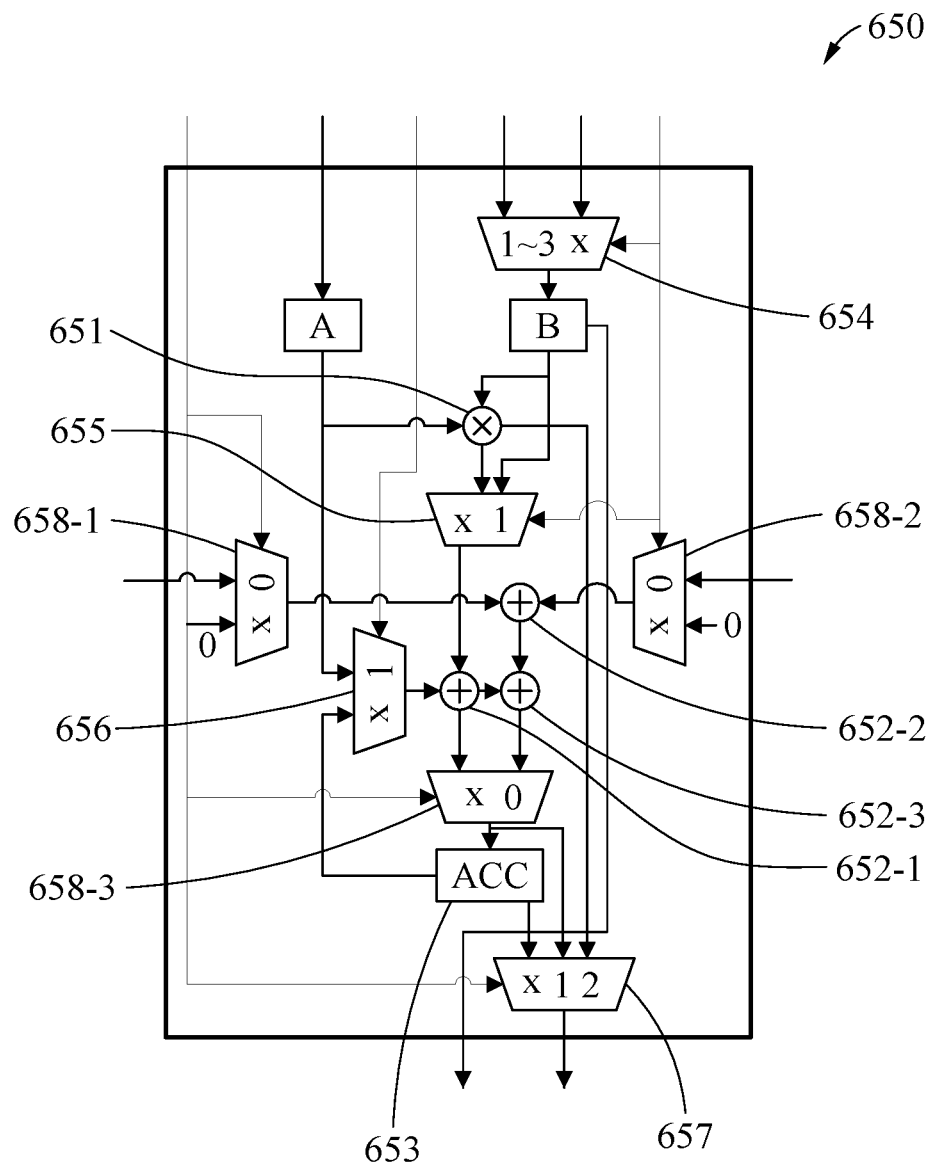
FIG. 3D illustrates an example of a PE of the apparatus for performing deep learning operations shown in FIG. 3A.

FIG. 3A illustrates an example of a circuit diagram of an apparatus for performing deep learning operations, and FIGS. 3B to 3D illustrate examples of PEs of the apparatus for performing deep learning operations shown in FIG. 3A.

Referring to FIGS. 3A to 3D, an apparatus 10 for performing deep learning operations may include a plurality of PEs 610, 630, and 650, a multiplexer 670, and a shift register 690.

The apparatus 10 may operate in a systolic adder tree mode and a SIMD mode. Specifically, the apparatus 10 may operate in input stationary and weight stationary manners in a systolic adder tree mode.

The apparatus 10 may perform elementwise add, elementwise multiply, and depthwise convolution operations in the SIMD mode.

The example of the apparatus disclosed in FIG. 3A may reduce power consumption required for operations using a structure excluding the output stationary manner of the systolic mode, compared to the example of FIG. 2A.

In the example of FIG. 3B, the PE 610 may include a multiplier 611, an adder 612, and an accumulator 613. The PE 610 may further include multiplexers 614, 615, 616, and 617.

The operations of the multiplier 611, the adder 612, and the accumulator 613 may be the same as those of the multiplier 511, the adder 512, and the accumulator 513 described in FIG. 2B. The operations of the multiplexers 614, 615, 616, and 617 may be the same as those of the multiplexers 514, 515, 516, and 517 described in FIG. 2B.

In the example of FIG. 3C, the PE 630 may include a multiplier 631, an adder 632, and an accumulator 633. The PE 630 may further include multiplexers 634, 635, 636, and 637.

The operations of the multiplier 631, the adder 632, and the accumulator 633 may be the same as those described in FIG. 2B. The operation of the multiplexer 634 may be the same as that of the multiplexer 514, and the operation of the multiplexer 635 may be the same as that of the multiplexer 515.

The operation of the multiplexer 636 may be the same as that of the multiplexer 516, and the operation of the multiplexer 637 may be the same as that of the multiplexer 517.

Unlike the PE 530 of FIG. 2C, the PE 630 may have no path for receiving data A from the PE on the left side.

FIG. 3D illustrates an example of a circuit diagram in which the PE 650 is located at the center of the systolic array 100. The PE 650 may include a multiplier 651 and adders 652-1, 652-2, and 652-3. The PE 650 may further include multiplexers 654, 655, 656, 657, 658-1, 658-2, and 658-3.

The operations of the multiplier 651, the adders 652-1, 652-2, and 652-3, and the accumulator 653 may be the same as those described in FIG. 2B. The operation of the multiplexer 654 may be the same as that of the multiplexer 514, and the operation of the multiplexer 655 may be the same as that of the multiplexer 515. The operation of the multiplexer 656 may be the same as that of the multiplexer 556.

The multiplexer 657 may selectively output one of an output of the accumulator 653, the multiplier 651, and an output of the multiplexer 658-3 in response to a control signal from the control circuit 300. The multiplexer 657 may be connected to a multiplexer 670 located outside the PE 650. The input data B may also be output to the outside of the PE 650.

The operations of the multiplexers 658-1, 658-2, and 658-3 may be the same as those of the multiplexers 559-1, 559-2, and 559-3 of FIG. 2D.

The operations of the multiplexer 670 and the shift register 690 may be the same as those of the multiplexer 570 and the shift register 590 described above.

Figure 4A:
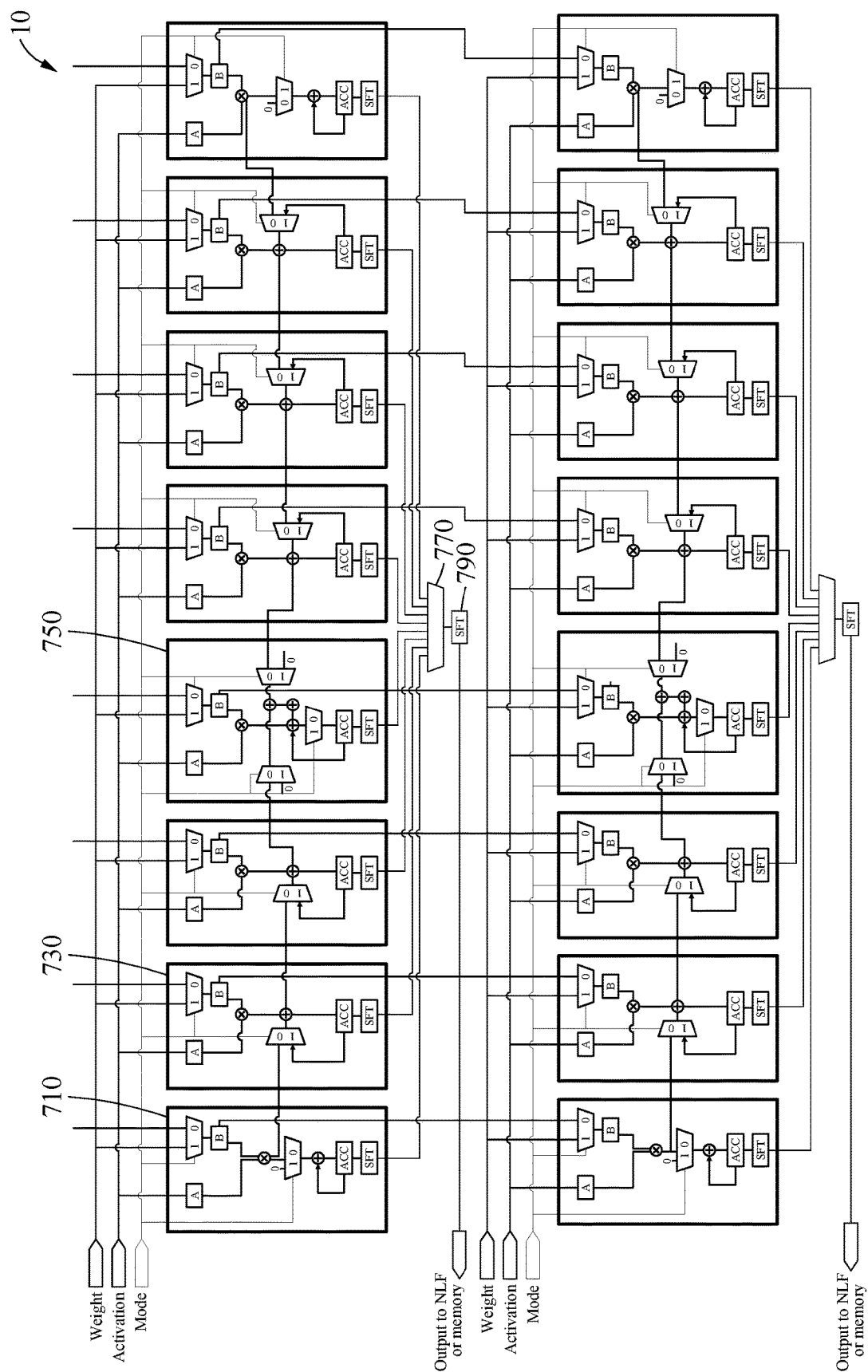
FIG. 4A illustrates an example of a circuit diagram of an apparatus for performing deep learning operations.
Figure 4B:
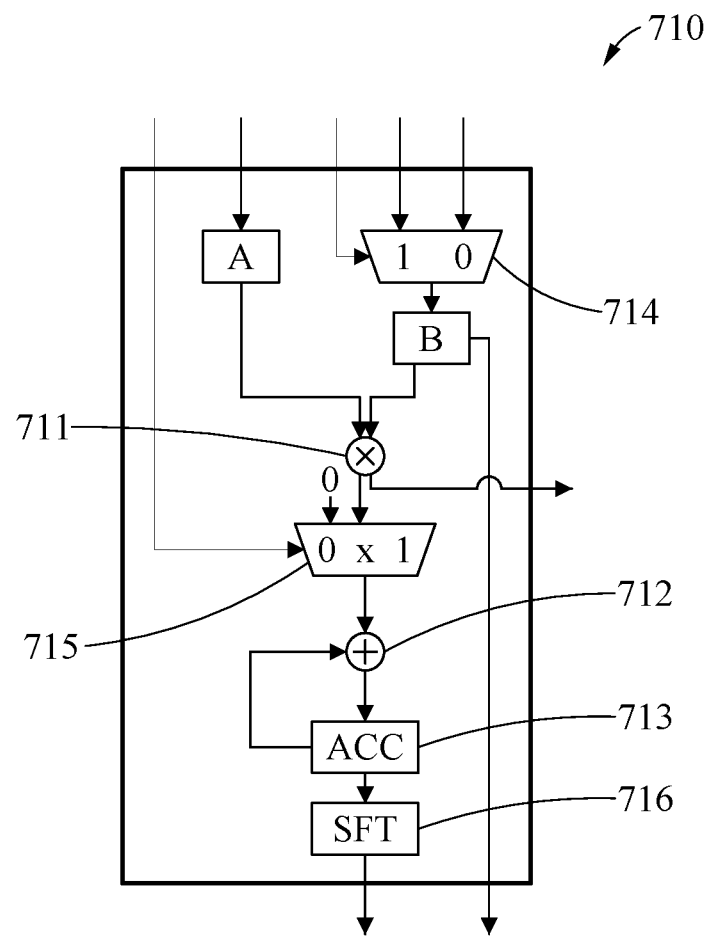
FIG. 4B illustrates an example of a PE of the apparatus for performing deep learning operations shown in FIG. 4A.
Figure 4C:
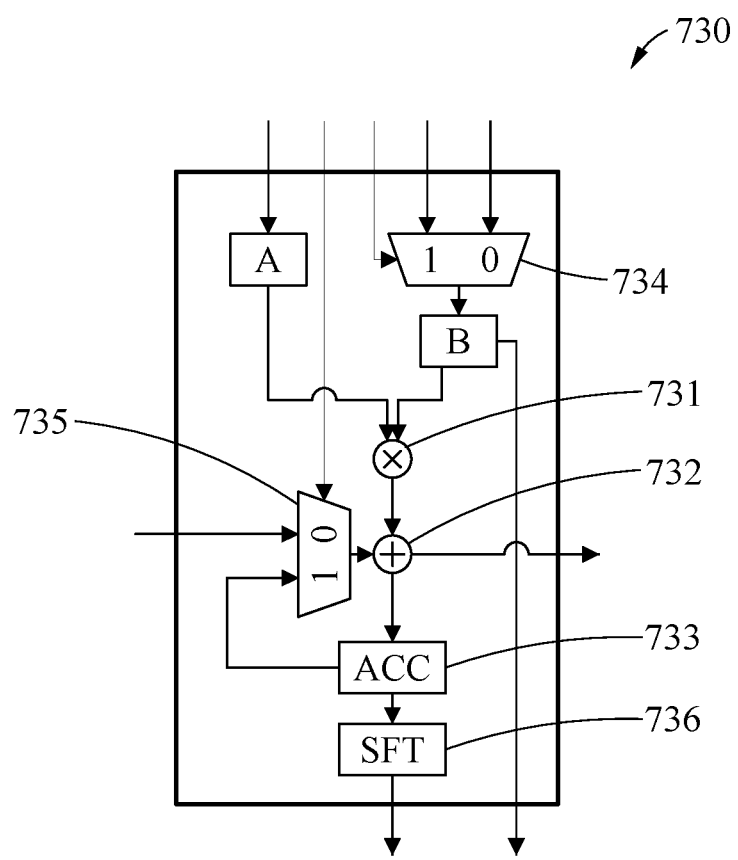
FIG. 4C illustrates an example of a PE of the apparatus for performing deep learning operations shown in FIG. 4A.
Figure 4D:
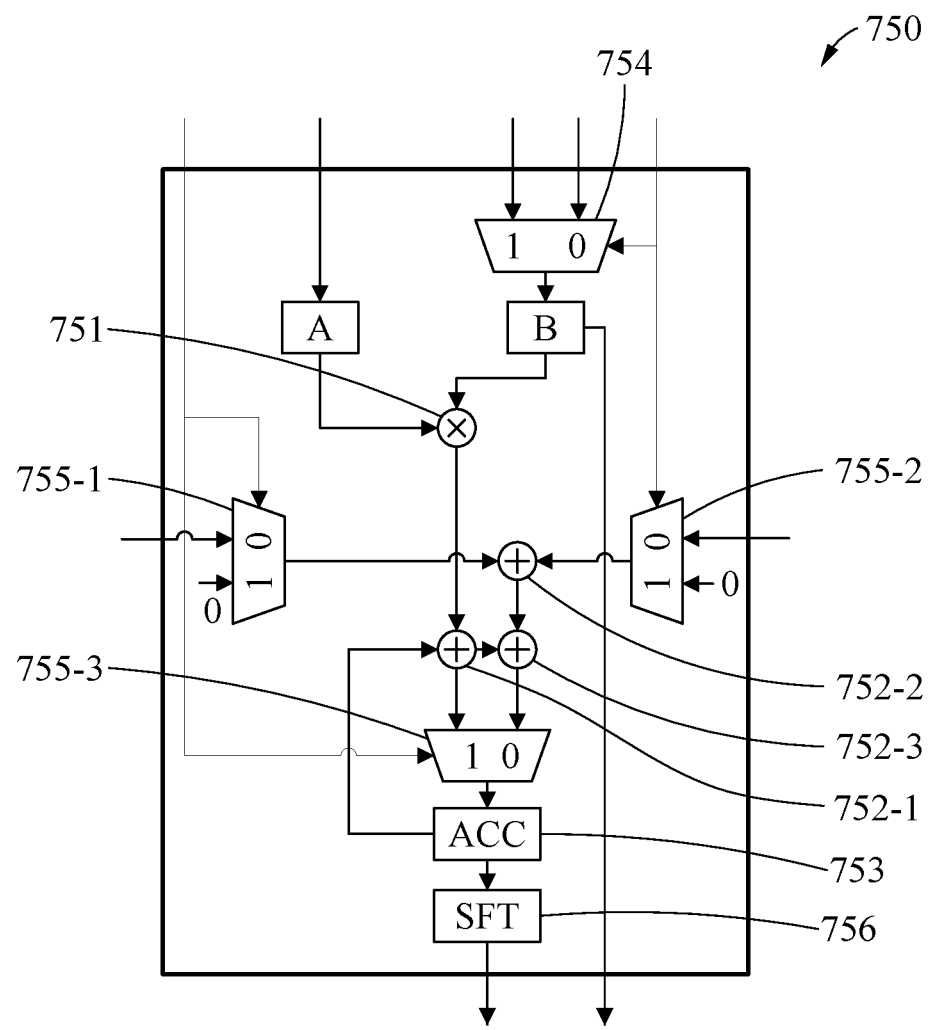
FIG. 4D illustrates an example of a PE of the apparatus for performing deep learning operations shown in FIG. 4A.

FIG. 4A illustrates an example of a circuit diagram of an apparatus for performing deep learning operations, and FIGS. 4B to 4D illustrate examples of PEs of the apparatus for performing deep learning operations shown in FIG. 4A.

Referring to FIGS. 4A to 4D, an apparatus 10 for performing deep learning operations may include a plurality of PEs 710, 730, and 750, a multiplexer 770, and a shift register 790.

The apparatus 10 may operate in a systolic adder tree mode and a SIMD mode. Specifically, the apparatus 10 may operate in input stationary and weight stationary manners in a systolic adder tree mode. The apparatus 10 may perform a depthwise convolution operation in the SIMD mode.

Unlike the examples of FIGS. 2A and 3A, the example of FIG. 4A may not process outputs in every operation cycle. To this end, the outputs of all the PEs included in the systolic array 100 may be connected to the multiplexer 770, and the control circuit 300 may control a clock frequency applied to a logical circuit generating a selection signal of the multiplexer 770 to be an integer multiple of a clock frequency applied to the PEs 710, 730, and 750, whereby the number of output wires may be greatly reduced.

The example of FIG. 4A may support depthwise convolution and matrix operations if there is a vector processor supporting a separate elementwise operation. Through this, the MAC utilization may improve compared to the case where a general adder tree performs a depthwise convolution operation.

In the example of FIG. 4B, the PE 710 may include a multiplier 711, an adder 712, and an accumulator 713. The PE 710 may further include multiplexers 714 and 715 and a shift register 716.

The operations of the multiplier 711, the adder 712, and the accumulator 713 may be the same as those of the multiplier 511, the adder 512, and the accumulator 513 described in FIG. 2B. The operation of the multiplexer 714 may be the same as that of the multiplexer 514 described in FIG. 2B.

The multiplexer 715 may selectively output one of 0 and an output of the multiplier 711 to the adder 712 in response to a control signal from the control circuit 300.

The shift register 716 may shift an output of the accumulator 713 based on the received clock frequency.

In the example of FIG. 4C, the PE 730 may include a multiplier 731, an adder 732, and an accumulator 733. The PE 730 may further include multiplexers 734 and 735 and a shift register 736.

The operations of the multiplier 731, the adder 732, and the accumulator 733 may be the same as those described in FIG. 4B. The operation of the multiplexer 734 may be the same as that of the multiplexer 714.

The multiplexer 735 may selectively output one of the output of the multiplier 711 of the PE 710 and an output of the accumulator 733 to the adder 732 in response to a control signal from the control circuit 300. The operation of the shift register 736 may be the same as that of the shift register 716.

FIG. 4D illustrates an example of a circuit diagram in which the PE 750 is located at the center of the systolic array 100. The PE 750 may include a multiplier 751 and adders 752-1, 752-2, and 752-3. The PE 750 may further include multiplexers 754, 755-1, 755-2, and 755-3.

The operations of the multiplier 751, the adders 752-1, 752-2, and 752-3, and the accumulator 753 may be the same as those described in FIG. 2B. The operation of the multiplexer 754 may be the same as that of the multiplexer 714, and the operation of the multiplexer 755-1 may be the same as that of the multiplexer 735.

The multiplexer 755-2 may selectively output one of 0 and an output of an adder of the PE located on the right side of the PE 750 to the adder 752-2 in response to a control signal from the control circuit 300.

The multiplexer 755-3 may selectively output one of the outputs of the adder 752-1 and the adder 752-3 to the accumulator 753 in response to a control signal from the control circuit 300. The operation of the shift register 756 may be the same as that of the shift register 716.

Figure 5:
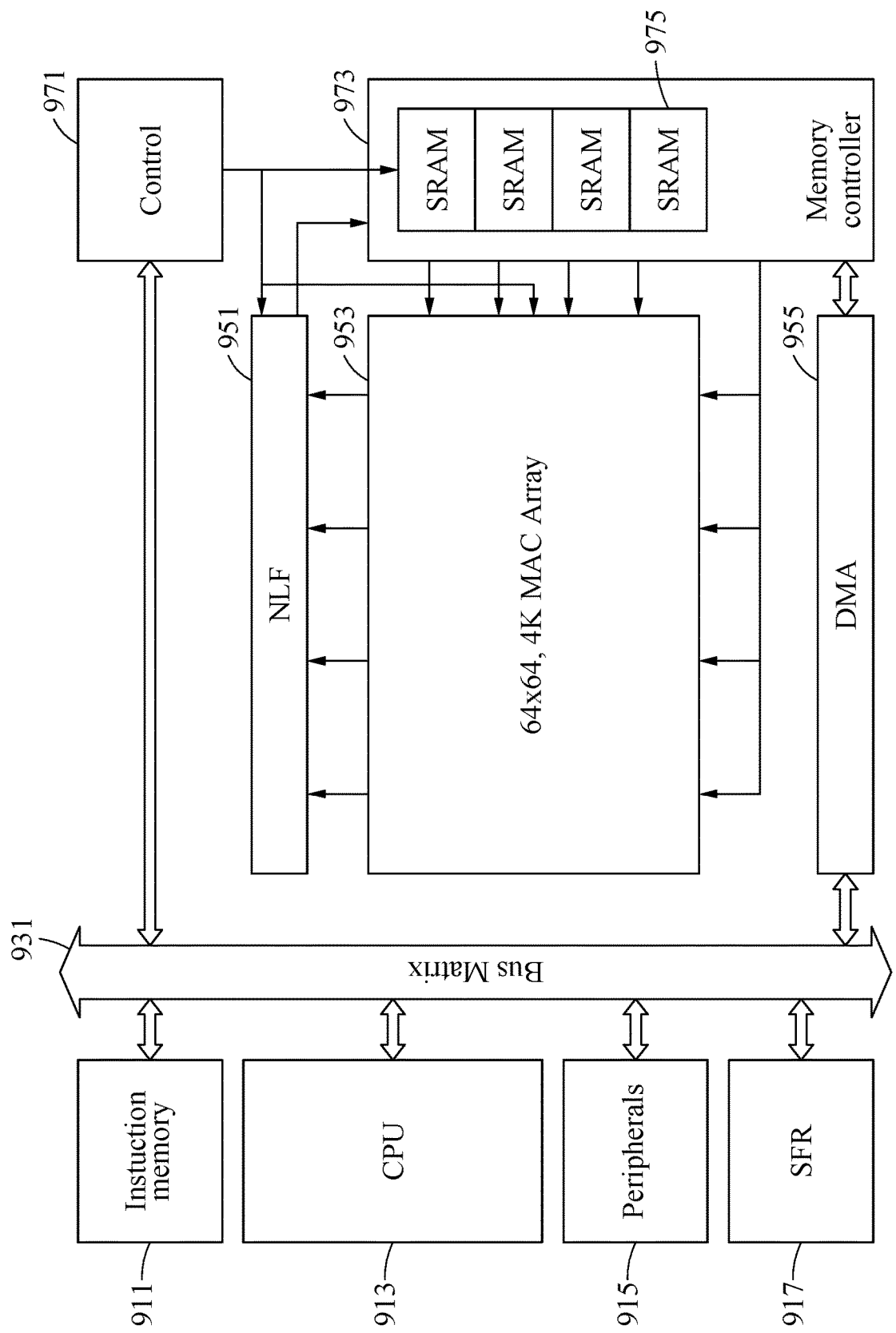
FIG. 5 illustrates an example of hardware implementation of an apparatus for performing deep learning operations.

FIG. 5 illustrates an example of hardware implementation of an apparatus for performing deep learning operations.

Referring to FIG. 5, an apparatus 10 for performing deep learning operations may include an instruction memory 911, a central processing unit (CPU) 913, peripherals 915, and a special function register (SFR) 917.

The apparatus 10 may further include a non-linear function (NLF) 951, a MAC array 953, a direct memory access (DMA) 955, and a control unit 971.

The apparatus 10 may further include a memory controller 973 including a plurality of static random-access memories (SRAMs) 975.

Figure 6:
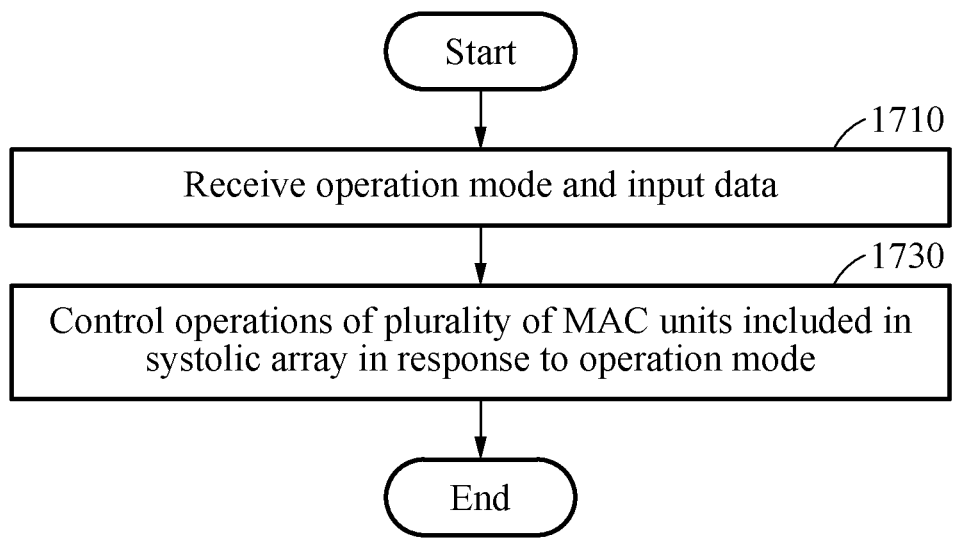
FIG. 6 illustrates an example of an operation of an apparatus for performing deep learning operations.

FIG. 6 illustrates an example of an operation of an apparatus for performing deep learning operations.

Referring to FIG. 6, in operation 1710, a control circuit 300 may receive an operation mode and input data. The operation mode may include an adder tree mode, a SIMD mode, and a systolic mode. In addition, each mode may include input stationary, weight stationary, and output stationary operations.

In operation 1730, the control circuit 300 may control operations of the plurality of MAC units 200-1, 200-2, . . . , 200-n included in the systolic array 100 in response to the operation mode.

The control circuit 300 may control the multiplexer 400 connected to at least one of the plurality of MAC units 200-1, 200-2, . . . 200-n. Specifically, the control circuit 300 may apply a clock frequency that is an integer multiple of a clock frequency applied to the plurality of MAC units 200-1, 200-2, . . . 200-n, to the multiplexer 400.

The control circuit 300 may control inputs of adders of the plurality of MAC units 200-1, 200-2, . . . 200-n in response to the operation mode. The control circuit 300 may control outputs of accumulators of the plurality of MAC units 200-1, 200-2, . . . 200-n in response to the operation mode. Further, the control circuit 300 may control outputs of a plurality of second multiplexers that control the outputs of the accumulators.

The shift register connected to the multiplexer 400 may shift the input or output of the multiplexer 400. Specifically, the shift register may shift the outputs of the accumulators included in the plurality of MAC units 200-1, 200-2, . . . 200-n.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of performing deep learning operations. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for performing deep learning operations, the apparatus comprising:
a systolic array comprising a plurality of multiplier accumulator (MAC) units; and a control circuit configured to:
control an operation of a multiplexer connected to at least one MAC unit of the plurality of MAC units; and
control operations of the plurality of MAC units according to a plurality of operation modes,
wherein, for each of multiple MAC units of the plurality of MAC units, the multiplexer includes:
a second multiplexer connected to an output terminal of an accumulator of a corresponding MAC unit, the accumulator being separate from an adder of the corresponding MAC unit; and
a third multiplexer connected to output terminals of the multiple MAC units receiving output of the multiple MAC units as input; and
wherein a shift register is connected to the third multiplexer and receiving output of the third multiplexer as input.

2. The apparatus of claim 1, wherein the multiplexer comprises, for each of the multiple MAC units, a first multiplexer connected to an input terminal of the adder of the corresponding MAC unit.

3. The apparatus of claim 2, wherein, for each of the multiple MAC units, the first multiplexer and the second multiplexer are configured to operate based on a respective first clock frequency.

4. The apparatus of claim 1, wherein, for each of the multiple MAC units, a first multiplexer of the multiplexer is connected to input terminals of the corresponding MAC unit.

5. The apparatus of claim 1, wherein the third multiplexer and the shift register are configured to operate based on a second clock frequency, and
the second clock frequency is an integer multiple of a first clock frequency applied to a MAC unit of the multiple MAC units.

6. The apparatus of claim 5, wherein a ratio of the first clock frequency and the second clock frequency is determined based on a number of the multiple MAC units connected to the third multiplexer.

7. An apparatus for performing deep learning operations, the apparatus comprising:
a systolic array comprising multiplier accumulator (MAC) units;
a control circuit configured to control an operation of a multiplexer connected to at least one of the MAC units and operations of the MAC units according to a plurality of operation modes,
wherein the multiplexer further comprises a third multiplexer connected to output terminals of the MAC units,
wherein a shift register connected to the third multiplexer, and
wherein the third multiplexer and the shift register are configured to operate based on a second clock frequency, and the second clock frequency is an integer multiple of a first clock frequency applied to the MAC units.

8. The apparatus of claim 7, wherein a ratio of the first clock frequency and the second clock frequency is determined based on the number of MAC units connected to the third multiplexer.

9. A method of performing deep learning operations, the method comprising:
receiving an operation mode and input data;
controlling operations of a plurality of multiplier accumulator (MAC) units included in a systolic array in response to the operation mode, each MAC unit comprises an accumulator and an adder, the accumulator being separate from the adder and configured to perform an accumulating convolution operation, with respect to respective results of the adder over time, where all accumulating convolution operations performed by the respective accumulators are distinct from adding operations performed by the respective adders; and
controlling a multiplexer connected to at least one MAC unit of the plurality of MAC units,
wherein, for each of multiple MAC units of the plurality of MAC units, in response to the operation mode, the controlling of the multiplexer comprises:
controlling respective accumulating convolution operations of the accumulators of the multiple MAC units;
receiving respective outputs of the multiple MAC units as input; and
shifting the respective outputs of the multiple MAC units.

10. The method of claim 9, wherein the controlling of the multiplexer comprises controlling respective inputs of the adders of the multiple of MAC units in response to the operation mode.

11. The method of claim 9, wherein the controlling of the plurality of MAC units, a controlling of respective inputs of the adders of the multiple of MAC units, and controlling outputs of the accumulators of the multiple of MAC units are performed based on a first clock frequency.

12. The method of claim 9, wherein the controlling of the respective outputs of the plurality of MAC units and the shifting of the respective outputs of the multiple of MAC units are performed based on a second clock frequency, and
the second clock frequency is an integer multiple of a first clock frequency for:
the controlling of the multiple of MAC units;
a controlling of respective inputs of the adders of the multiple of MAC units; and
controlling of respective outputs of the accumulators of the multiple of MAC units.

13. The method of claim 12, wherein a ratio of the first clock frequency and the second clock frequency is determined based on a number of MAC units of the multiple of MAC units that are connected to the multiplexer configured to control the respective outputs of the multiple of MAC units.

14. The method of claim 9, wherein the controlling of the multiplexer comprises controlling respective inputs of the plurality of MAC units in response to the operation mode.

15. A non-transitory computer-readable storage medium storing instructions that, when executed by a processor, cause the processor to perform the method of claim 9.

16. An apparatus for performing deep learning operations, the apparatus comprising:
a systolic array comprising a plurality of multiplier accumulator (MAC) units;
a multiplexer set connected to the plurality of MAC units; and
a control circuit configured to control an operation of the multiplexer set and the plurality of MAC units according to a plurality of operation modes,
wherein each MAC unit comprises an adder and an accumulator that is separate from the adder, the accumulator is configured to perform an accumulating convolution operation of a respective channel for depthwise convolution of plural channels, where all accumulating convolution operations performed by the respective accumulators are distinct from adding operations performed by the respective adders wherein the multiplexer set comprises:
a plurality of first multiplexers, each first multiplexer is connected to an input terminal of an adder of each respective MAC unit of the plurality of MAC units;
a plurality of second multiplexers, each second multiplexer is connected to an output terminal of an accumulator of each respective MAC unit of the plurality of MAC units; and
a third multiplexer, connected to output terminals of the plurality of MAC units, and receive an output of each respective MAC unit of the plurality of MAC units as input.

17. The apparatus of claim 16, further comprising a shift register connected to the third multiplexer and the third multiplexer is further connected to an output terminal of the second multiplexer.

18. The apparatus of claim 16, wherein the at least one MAC unit, the first multiplexer, and the second multiplexer operate on a first clock frequency, and the third multiplexer operates on a second clock frequency that is an integer multiple of the first clock frequency.

19. The apparatus of claim 18, wherein a ratio of the first clock frequency and the second clock frequency is determined based on a number of MAC units of the plurality of MAC units connected to the third multiplexer.

20. An apparatus for performing deep learning operations, the apparatus comprising:
a systolic array comprising a plurality of multiplier accumulator (MAC) units;
a multiplexer set respectively connected to at least one MAC unit of the plurality of MAC units; and
a control circuit configured to control an operation of the multiplexer set and the plurality of MAC units according to a plurality of operation modes,
wherein the multiplexer set comprises:
a first multiplexer connected to an input terminal of an accumulator of the at least one MAC unit;
a second multiplexer connected to an output terminal of the accumulator of the at least one MAC unit; and
a third multiplexer connected to output terminals of the plurality of MAC units, and
wherein the at least one MAC unit, the first multiplexer, and the second multiplexer operate on a first clock frequency, and the third multiplexer operates on a second clock frequency that is an integer multiple of the first clock frequency.

21. The apparatus of claim 20, wherein a ratio of the first clock frequency and the second clock frequency is determined based on a number of MAC units connected to the third multiplexer.

* * * * *